United States Patent
Kaufmann

(10) Patent No.: US 12,418,182 B2
(45) Date of Patent: Sep. 16, 2025

(54) METHOD FOR ESTABLISHING A SUPPLY VOLTAGE AND INVERTER

(71) Applicant: TRUMPF Huettinger GmbH + Co. KG, Freiburg (DE)

(72) Inventor: Jens Kaufmann, Davos Platz (CH)

(73) Assignee: TRUMPF HUETTINGER GMBH + CO. KG, Freiburg (DE)

( * ) Notice: Subject to any disclaimer, the term of this patent is extended or adjusted under 35 U.S.C. 154(b) by 63 days.

(21) Appl. No.: 18/505,191

(22) Filed: Nov. 9, 2023

(65) Prior Publication Data
US 2024/0243584 A1 Jul. 18, 2024

Related U.S. Application Data

(63) Continuation of application No. PCT/EP2022/062699, filed on May 10, 2022.

(30) Foreign Application Priority Data

May 10, 2021 (DE) ...................... 10 2021 204 721.1

(51) Int. Cl.
*H02J 3/40* (2006.01)
*H02J 3/10* (2006.01)
*H02J 3/38* (2006.01)
*H02J 3/48* (2006.01)

(52) U.S. Cl.
CPC .................. *H02J 3/40* (2013.01); *H02J 3/10* (2013.01); *H02J 3/381* (2013.01); *H02J 3/48* (2013.01)

(58) Field of Classification Search
CPC ...... H02J 3/40; H02J 3/10; H02J 3/381; H02J 3/48; H02J 3/388; H02J 5/00
USPC .......................................................... 307/82
See application file for complete search history.

(56) References Cited

U.S. PATENT DOCUMENTS

2015/0380942 A1  12/2015  Premm et al.

FOREIGN PATENT DOCUMENTS

| CA | 3027225 | * | 2/2021 |
|----|---------|---|--------|
| CN | 110137987 A | | 8/2019 |
| CN | 111799836 A | | 10/2020 |
| DE | 102013102603 B4 | | 2/2017 |
| DE | 102019116254 A1 | | 12/2020 |
| JP | 2001078363 | * | 3/2001 |

* cited by examiner

*Primary Examiner* — Richard Tan
(74) *Attorney, Agent, or Firm* — LEYDIG, VOIT & MAYER, LTD.

(57) ABSTRACT

A method for building up a mains voltage by using a plurality of independently controlled virtual synchronous machine (VISMA) power inverters includes supplying each VISMA power inverter with power, starting a VISMA control in each VISMA power inverter by specifying a target mains voltage to a control model of the plurality of VISMA power inverters for generating a virtual target mains voltage in each VISMA power inverter, transferring a synchronization event to all of the plurality of VISMA power inverters for phase matching of the virtual target mains voltages of the plurality of VISMA power inverters with respect to one another, building up an output AC voltage with a matched phase position depending on the target mains voltage and the synchronization event in each VISMA power inverter, and simultaneously building up of the mains voltage by all of the plurality of VISMA power inverters using the output AC voltages.

17 Claims, 2 Drawing Sheets

METHOD FOR ESTABLISHING A SUPPLY VOLTAGE AND INVERTER

CROSS REFERENCE TO RELATED APPLICATIONS

This application is a continuation of International Application No. PCT/EP2022/062699 (WO 2022/238438 A1), filed on May 10, 2022, and claims benefit to German Patent Application No. DE 102021204721.1, filed on May 10, 2021. The aforementioned applications are hereby incorporated by reference herein.

FIELD

Embodiments of the present invention relate to a method for building up a mains voltage by means of a plurality of independently controlled VISMA power inverters that are together connected to a load, the load requiring more power than a single one of these power inverters can deliver. Embodiments of the present invention also relate to a power inverter and a voltage supply system.

BACKGROUND

According to a definition at <http://www.iee.tu-clausthal.de/en/visma/>, a virtual synchronous machine—VISMA for short—is a special power inverter that was developed predominantly for the feeding of renewably generated electrical energy into decentralized and electrically weak power systems. A feature of this power inverter concept is the analogy to the electromechanical synchronous machine, the static and dynamic operating behavior of which is mapped onto this power inverter to the greatest extent possible.

A VISMA power inverter consequently has a control that allows it to act like a synchronous machine for other power system participants. Further information about VISMA power inverters is found in Hesse et al. "Micro grid stabilization using the Virtual Synchronous Machine (VISMA)", International Conference on Renewable Energies and Power Quality (ICREPQ'09), Valencia (Spain), 15 to 17 Apr. 2009, and Chen et al. "Comparison of methods for implementing virtual synchronous machine on inverters", RE&PQJ, Vol. 1, No. 10, April 2012, p. 734-739.

VISMA power inverters have not yet become widely accepted on the market. Such power inverters are still very rare for powers of 1 kW to 500 KW in particular. With the increasing number of power inverters in the case of renewable energy sources and therefore replacement of mechanically rotating energy sources, it will become increasingly important however to use such power inverters so that the power systems can be kept stable, in the case of short power system fluctuations. VISMA power inverters in principle have no problem connecting to an existing interconnected power system and operating to support the power system at the same time. These advantages should also be usable in small power systems, such as isolated power systems. Therefore, the same VISMA power inverters with the same control are preferably also used in such power systems. Problems may occur in this case if, to supply a load, a plurality of VISMA power inverters need to be switched on simultaneously, if no mains voltage has hitherto been present. That is the typical case for a start of a power system that is switched off, which needs be ramped up again. This ramping up is also termed a black start. In isolated power systems, for example in very small isolated power systems, that is a case that occurs often.

DE 10 2013 102 603 B4 discloses a method for a black start of a power plant having a plurality of power inverters that can be connected to a local AC power system, wherein an AC voltage is built up in the AC power system using a first power inverter, a second power inverter is connected to the AC power system after synchronization with the AC voltage, the first AC voltage that is built up using the first power inverter is reduced by at least a fourth compared to a nominal voltage of the AC power system and, after the connection of the second power inverter, a second AC voltage, which is increased compared to the first AC voltage, is built up in the AC power system.

SUMMARY

Embodiments of the present invention provide a method for building up a mains voltage by using a plurality of independently controlled virtual synchronous machine (VISMA) power inverters that are together connected to a load. The load requires more power than a single one of the plurality of VISMA power inverters is able to deliver. The method includes supplying each VISMA power inverter with power, starting a VISMA control in each VISMA power inverter by specifying a target mains voltage to a control model of the plurality of VISMA power inverters for generating a virtual target mains voltage in each VISMA power inverter, transferring a synchronization event to all of the plurality of VISMA power inverters for phase matching of the virtual target mains voltages of the plurality of VISMA power inverters with respect to one another, building up an output AC voltage with a matched phase position depending on the target mains voltage and the synchronization event in each VISMA power inverter, and simultaneously building up of the mains voltage by all of the plurality of VISMA power inverters using the output AC voltages.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
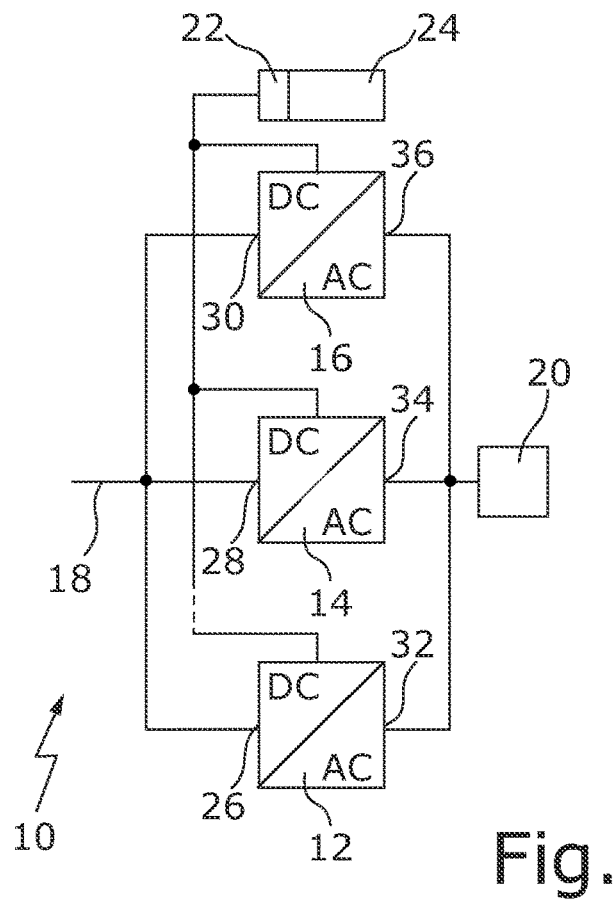
FIG. 1 shows an illustration of a voltage supply system having a plurality of power inverters according to some embodiments.

Embodiments of the invention provide a method and a power inverter, using which the power system build-up for operating a load—which requires more power than each individual power inverter can deliver—succeeds.

According to some embodiments, a method for building up a mains voltage by means of a plurality of independently controlled VISMA power inverters that are together connected to a load, the load requiring more power than a single one of these VISMA power inverters can deliver, having the method steps:
supplying each power inverter with power;
starting a VISMA control in each VISMA power inverter by specifying a target mains voltage to a control model of the VISMA power inverters in particular for generating a virtual target mains voltage in each VISMA power inverter,
transferring a synchronization event to all VISMA power inverters for phase matching of the virtual target mains voltages of the VISMA power inverters with respect to one another,
building up an output AC voltage with matched phase position depending on the target mains voltage and the synchronization event in each VISMA power inverter,
simultaneous building up of the mains voltage by all VISMA power inverters using the output AC voltages.

As all independently controlled VISMA power inverters are connected to a load together, it is unmistakably clear that
the build-up of the mains voltage can only take place at the same time as the build-up of the output AC voltages and consequently the two steps d. and e. take place simultaneously, and
the mains voltage means the voltage at the connected load.

Here, 'specifying a target mains voltage' means specifying at least one voltage amplitude and a frequency. Thus, each VISMA power inverter can build up its own virtual target mains voltage.

Therefore, for example, a black start of an isolated power system or interconnected power system by means of a plurality of VISMA power inverters, which are controlled independently of one another and which model the behavior of a virtual synchronous machine (VISMA), is possible, wherein the required power of the load to be supplied exceeds the power of an individual power inverter. This is to be understood such that prior to the build-up of an output AC voltage, the phase position of the VISMA power inverters is matched with the aid of the synchronization event and after that the VISMA power inverters continue to run in each case independently of one another according to their VISMA automatic control system and when the output AC voltage is built up, the phase position of the output AC voltages is furthermore satisfactorily matched and the phase position therefore only diverges insignificantly between these two steps. The method has the advantage that the load does not have to be disconnected from the VISMA power inverters during the build-up of the mains voltage and would not have to be connected via power circuit breakers. The load can be coupled the whole time. This saves expensive power circuit breakers, what are known as protective devices, as are necessary in the case of other arrangements.

For the sake of understanding, it is mentioned once more that a conventional VISMA power inverter, which behaves like a virtual synchronous machine in terms of control technology, can automatically support existing power systems or isolated power systems and, after synchronization has taken place, can be connected in parallel as desired, like actual synchronous machines. An individual conventional VISMA power inverter can in this case also build up an isolated power system, to which further power inverters can synchronize. For the black start of an isolated power system using a plurality of VISMA-based power inverters simultaneously, it is necessary that all power inverters start the voltage build-up as exactly as possible at the same time with the same phase position. To this end, the power inverters need to be synchronized in advance. Thus, synchronization means the matching of the phase position. It is problematic that it is not possible to fall back on an existing system for synchronization. This problem is solved using the described method.

The power for supplying the power inverters can originate from a DC source, such as a battery.

The method steps b. and c. can take place simultaneously or successively in any desired sequence.

A simultaneous build-up of the mains voltage means that the time interval is typically less than one period (50 Hz→20 ms), preferably 5 ms or less, preferably 1 ms or less.

The specification of the target mains voltage can take place with a predetermined mains frequency depending on a virtual target mains voltage that is passed to a control model of the VISMA power inverter in particular.

Usually, a controller of a VISMA power inverter uses the actual measured mains voltage for control. As such a measured mains voltage is not present, e.g. in the case of a black start, stored or predetermined values of such a mains voltage can be used. These values form the "virtual target mains voltage". This virtual target mains voltage has preferably an amplitude, preferably a frequency and preferably a phase position.

Each power inverter can generate a virtual target mains voltage itself. This has the advantage that a virtual target mains voltage does not have to be predetermined centrally and transmitted.

The matching of the phase position can take place by matching the phase position of the virtual target mains voltages in the power inverters. Thus, the output AC voltages can be synchronized before they are used for building up the mains voltage.

Furthermore, the matching of the phase position can take place by means of a first synchronization event, preferably a rising edge of a synchronization pulse. The synchronization event can therefore trigger the matching of the phase positions of the virtual mains voltages and thus lead to the matching of the phase positions of the output AC voltages.

The build-up of the mains voltage can be triggered by a second synchronization event, preferably a falling edge of a synchronization pulse. As a result, it is possible to ensure that a mains voltage is built up, which is suitable for supplying the load with power.

With or after the build-up of the mains voltage, the specification of the target mains voltage can change from the dependence of the virtual target mains voltage to a dependence on a measured mains voltage. This change can take place in particular with or after the second synchronization event. Therefore, the virtual target mains voltage can be used merely for building up the mains voltage and subsequently a measured mains voltage can be used.

The load to be supplied can be distributed evenly to the power inverters, triggered in particular by the second synchronization event. The even load distribution can take place automatically owing to the VISMA control.

A virtual target current value can be determined for each power inverter and a virtual current can be adjusted to the virtual target current value.

The target current value can be determined by the VISMA power inverter depending on the measured mains voltage. As long as the target mains voltage is still a virtual target mains voltage, then the target current value is also still a virtual target current value. The specification of the target current value can therefore also change in the same manner during the switch from the virtual target mains voltage to the actually measured mains voltage.

However, an adjustment can also take place to a virtual target current value if the actual mains voltage is measured on an existing power system before the power inverter is connected to the existing power system. In this case, the synchronization to an existing power system can take place by means of the measurement of the externally applied mains voltage that is passed into a control model of the power inverter. Based on the measured mains voltages, this model then calculates virtual target current values which are in turn returned to the model as actual values. In this manner, the virtual current is adjusted to the value that would be set during real operation on the present power system. As soon as the model has adjusted the virtual current to a constant value, the power inverter can be connected to the power system and be switched to the actual control using the actual values of the actual mains voltage of the existing power system.

According to embodiments of the invention, for the black start using a plurality of power inverters, recourse is had to the above-described synchronization mechanism, with the exception that the externally measured mains voltage is generated virtually in the individual power inverters. The phase position of the virtual target mains voltages can be precisely matched on all power inverters to a few µs, e.g. 4 µs or less, using the rising edge of a synchronization pulse that is sent by a controller. After that, the synchronization process as described for the mains parallel operation can start via the control model.

The mains voltage can be built up after the expiration of a response time of the virtual current. After the expiration of the response time of the virtual current, the controller can output a falling edge of the synchronization pulse, whereupon all power inverters can precisely simultaneously, to a few µs, switch to control using the actually measured voltages and can build up the mains voltage together. Large loads are in this case divided evenly to the power inverters from the start.

The response time may typically be one to 10 mains periods. That is to say typically 20 ms to 200 ms. The response time may be predetermined. Too large a value may be disadvantageous, as the phase synchronization may again vary so widely that it is no longer satisfactory for a simultaneous start. That is because each power inverter usually has its own time base, which may be inaccurate.

It is conceivable that a default value for the response time for power inverters will become accepted in the form of a standard.

Furthermore, it is conceivable that no response time is specified, but rather expiration is detected if all power inverters are adjusted. To this end, an additional communication channel would have to exist between the power inverters, on which the power inverters can communicate that they are adjusted.

Furthermore, it is conceivable not to specify a response time, but rather to build up the mains voltage when the deviation of virtual target current value from the virtual actual current value lies below a reference value for all power inverters.

With or after the response time, the specification of the target mains voltage can change from the dependence of the virtual target mains voltage to a dependence on a measured mains voltage.

The mains voltage can be built up over a defined ramp. The duration of a defined ramp may typically be a half, a whole or up to 5 periods. Due to the gradual building up of the mains voltage over a defined ramp, overcurrents can be avoided, when supplying a capacitive and/or inductive load.

A ramp may for example be realized in that the control in each power inverter is consciously overridden for the duration of the ramp with a setting mode and certain maximum values for voltage and/or current are not exceeded. Alternatively, control may take place by means of lowered control values.

The power inverters can be connected to a DC link for supply with power. This may take place for example by switching a switch.

According to some embodiments, a VISMA power inverter, having a synchronization event input and designed
    for building up a VISMA control of an output AC voltage
        at its output depending on a predetermined target mains voltage that can be predetermined for a control model of the VISMA power inverter in particular, and the VISMA power inverter is set up to generate a virtual target mains voltage on the basis of the predetermined target mains voltage and is further set up to synchronize the virtual target mains voltage to a first synchronization event that is received at the synchronization-event input, and thus
    to synchronize a phase position of the output AC voltage to this first synchronization event that is received at the synchronization-event input, and
    to build up a mains voltage after synchronization of the phase position has taken place.

According to some embodiments, a bundle of at least two power inverters of this type are provided.

A power inverter of this type is suitable in particular for building up a mains voltage in connection with further power inverters of the same kind, for example a mains voltage for supplying a load with power, wherein each individual power inverter is not configured to provide the power required by the load.

In this case, the power inverter can further be configured to build up the mains voltage synchronously to a second synchronization event.

Embodiments of the invention additionally relate to a voltage supply system having a plurality of independently controlled VISMA power inverters, having a synchronization event generator that is connected to each synchronization event input of the power inverters, the power inverters being designed to synchronize the phase position of their output AC voltage with respect to one another. For this purpose, each power inverter can have a CPU, an embedded control, an FPGA or a combination of some of the aforementioned.

The mains voltage in a voltage supply system of this type may be built up in the course of a black start in particular.

The power inverters may be connected to a system control. A system control may in this case be a superordinate controller that is operated e.g. by the power system operator.

The system control can be configured to output a synchronization signal to the power inverters. The synchronization signal may be an electrical pulse that is supplied via a line. The synchronization signal may also be supplied wirelessly. It may also be a data exchange, with which all power inverters are notified to synchronize at a certain synchronized time. The power inverters would have to have a synchronized clock to this end. This could for example take place via a GPS time signal, DCF77 time signal or other synchronization signals (e.g. on WIFI or mobile telephone networks, e.g. 5G).

A control model may be stored in the power inverter or, in the case of a voltage supply system, in at least one power inverter, which control model is configured to calculate a virtual current that is returned to the control model as virtual target current value. The above-described advantages result from this.

According to embodiments of the invention, the previously mentioned features and features yet to be discussed further can likewise be used in each case individually by themselves or as a plurality in arbitrary combinations. The embodiments shown and described are not to be understood as a final enumeration, but rather have an exemplary character.

FIG. 1 shows a voltage supply system 10 having a plurality of independently controlled VISMA power inverters 12, 14, 16. The power inverters 12, 14, 16 are connected to a DC link voltage 18, as a result of which the power inverters 12, 14, 16 are supplied with a DC voltage. At the output side, the power inverters 12, 14, 16 are connected to a load 20, wherein the load 20 requires more power than each individual power inverter 12, 14, 16 can deliver.

The power inverters 12, 14, 16 are connected to a synchronization event generator 22, which may be arranged in a centralized control 24. In particular, the synchronization event generator 22 is connected to each synchronization event input 26, 28, 30 of the power inverters 12, 14, 16. The power inverters 12, 14, 16 are designed to synchronize the phase position of their output AC voltages with respect to one another.

In particular, the power inverters 12, 14, 16 are designed to build up a VISMA control of an output AC voltage at their respective output 32, 34, 36 depending on a predetermined target mains voltage. Furthermore, they are designed to synchronize a phase position of the output AC voltage to a first synchronization event that is received at the synchronization event input 26, 28, 30 and to build up a mains voltage to supply the load 20 after synchronization of the phase position has taken place.

If the system control 24 receives a switch-on command, the power inverters 12, 14, 16 are connected to the DC link voltage 18, for example in that a corresponding switch is actuated so that the power inverters 12, 14, 16 are supplied with power. After that, the power inverters 12, 14, 16 wait for a first synchronization event from the synchronization event generator 22, for example a rising edge 40 of a synchronization pulse, cf. FIG. 2.

Figure 2:
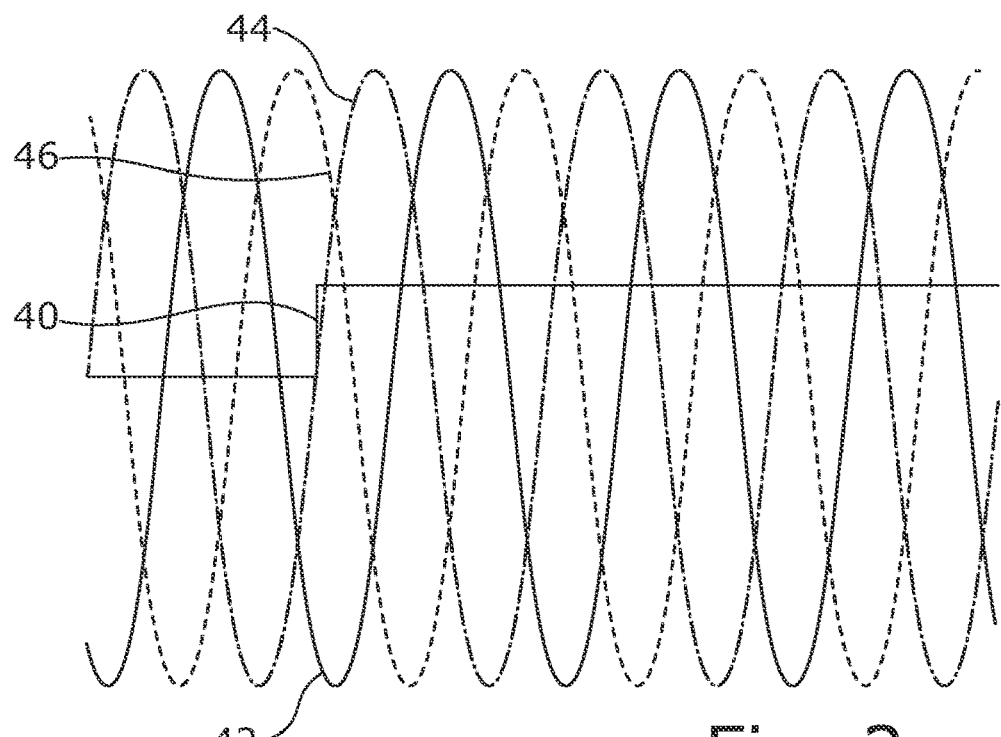
FIG. 2 shows the synchronization of the phase position of a plurality of AC voltages according to some embodiments.
Figure 3:
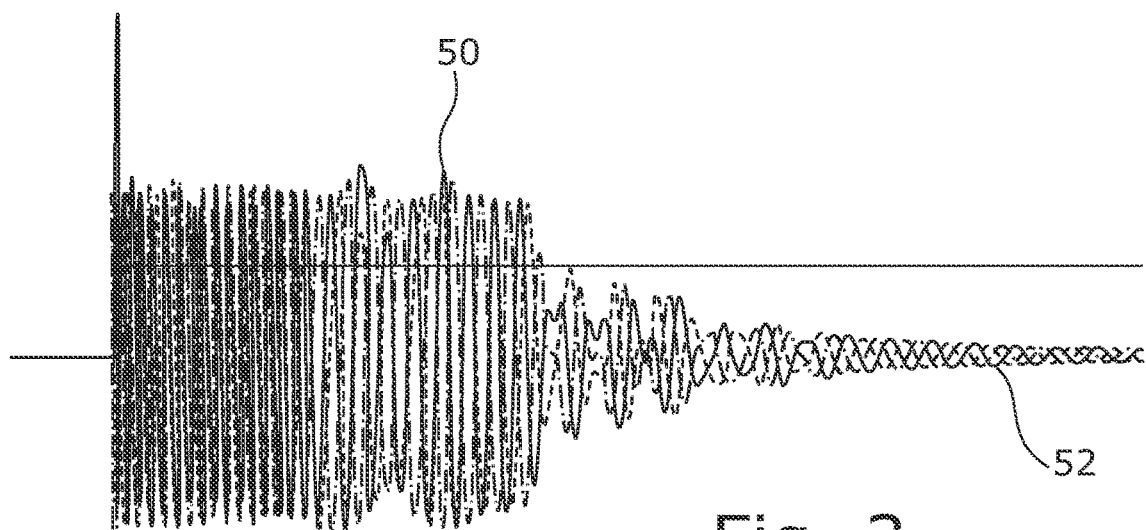
FIG. 3 shows virtual currents according to some embodiments.
Figure 4:
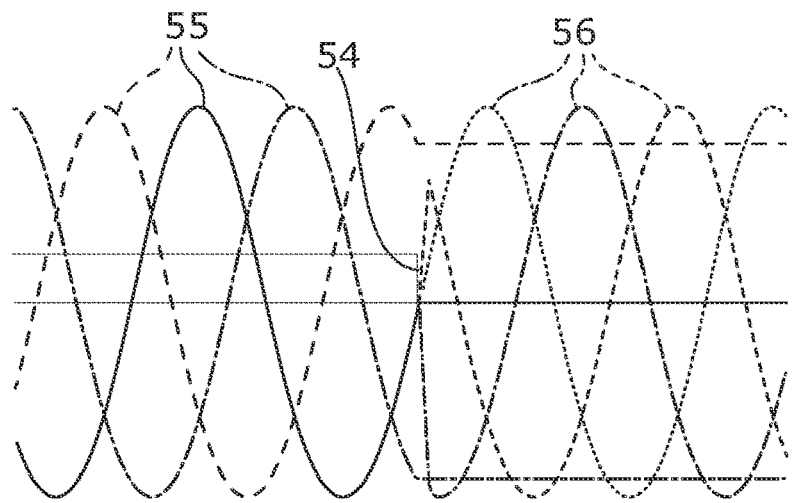
FIG. 4 shows the synchronization for building up a mains voltage according to some embodiments.

FIGS. 2-4 show the situation for one of the power inverters 12, 14, 16 in each case.

When the synchronization event is detected, each power inverter 12, 14, 16 can form a three-phase internal virtual target mains voltage 42, 44, 46 that corresponds to a predetermined target mains voltage. Each power inverter 12, 14, 16 in this case starts with the same phase position (in FIG. 2, zero crossing of 46). It is also conceivable to generate an internal virtual target mains voltage initially on the basis of the predetermined target mains voltage and then to synchronize the phase positions on the basis of the synchronization event. The virtual target mains voltage 42, 44, 46 is passed into a VISMA control model that calculates a virtual current 50, cf. FIG. 3, which in turn is returned to the control model as virtual target current value.

The building up of an output AC voltage with matched phase position takes place depending on the (virtual) target mains voltage and the first synchronization event in each power inverter 12, 14, 16.

The synchronization pulse stayed at high until the virtual current 50 was adjusted to a constant value (see position 52 in FIG. 3). If the virtual current 50 is adjusted, the power inverters 12, 14, 16 receive a second synchronization event 54, for example the falling edge of the synchronization pulse (cf. FIG. 4).

FIG. 4 first shows the virtual mains voltages 55. These remain constant after the second synchronization event 54. Upon the occurrence of the second synchronization event 54, the switch takes place from the control model to a control using the actual values of the actual mains voltage of the existing power system. The power inverters 12, 14, 16 then build up the mains voltages 56 over a defined ramp.

Figure 5:
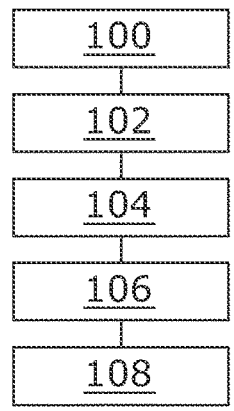
FIG. 5 shows a flowchart of a method according to some embodiments.

FIG. 5 gives the method steps of the method according to embodiments of the invention.

In step 100, each power inverter 12, 14, 16 is supplied with power, e.g. with DC voltage power, e.g. with a DC link voltage power.

In step 102, a VISMA control starts in each power inverter 12, 14, 16 by specifying a target mains voltage, for example a virtual target mains voltage. The specification of the target mains voltage can in this case take place to a control model of the VISMA power inverters 12, 14, 16 in particular for generating a virtual target mains voltage 42, 44, 46 in each VISMA power inverter 12, 14, 16.

In step 104, a synchronization event is transferred to all VISMA power inverters 12, 14, 16. The transfer is used for phase matching of the virtual target mains voltages 42, 44, 46 of the VISMA power inverters 12, 14, 16 with respect to one another.

The steps 104 (transfer of the synchronization event) and 102 (start of the VISMA control in each power inverter) can be carried out simultaneously or in any desired sequence.

The building up of an output AC voltage with matched phase position takes place in step 106 depending on the target mains voltage and the synchronization event in each VISMA power inverter 12, 14, 16. In this case, the VISMA power inverters 12, 14, 16 control themselves independently of one another in accordance with their own VISMA control algorithms.

The simultaneous building up of the mains voltage 56 by all power inverters 12, 14, 16 takes place in step 108 using the output AC voltages.

As all independently controlled VISMA power inverters 12, 14, 16 are connected to a load 20 together, it is unmistakably clear that here
a) the build-up of the mains voltage 56 can only take place at the same time as the build-up of the individual output AC voltages and consequently the two steps 106 and 108 take place simultaneously, and
b) the mains voltage 56 means the voltage at the connected load 20.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for building up a mains voltage by using a plurality of independently controlled virtual synchronous machine (VISMA) power inverters that are together connected to a load, the load requiring more power than a single one of the plurality of VISMA power inverters is able to deliver, the method comprising:
supplying each VISMA power inverter with power,
starting a VISMA control in each VISMA power inverter by specifying a target mains voltage to a control model of the plurality of VISMA power inverters for generating a virtual target mains voltage in each VISMA power inverter,
transferring a synchronization event to all of the plurality of VISMA power inverters for phase matching of the virtual target mains voltages of the plurality of VISMA power inverters with respect to one another,
building up an output AC voltage with a matched phase position depending on the target mains voltage and the synchronization event in each VISMA power inverter, and
simultaneously building up of the mains voltage by all of the plurality of VISMA power inverters with the matched phase position using the output AC voltages.

2. The method as claimed in claim 1, wherein the specification of the target mains voltage is performed with a predetermined mains frequency depending on the virtual target mains voltage that is passed to the control model of the VISMA power inverters.

3. The method as claimed in claim 2, wherein each VISMA power inverter generates the virtual target mains voltage itself.

4. The method as claimed in claim 2, wherein the phase matching is performed by matching the phase position of the virtual target mains voltages in the plurality of VISMA power inverters.

5. The method as claimed in claim 1, wherein the phase matching is performed by a first synchronization event, the first synchronization event being a rising edge of a synchronization pulse.

6. The method as claimed in claim 1, wherein the building up of the mains voltage is triggered by a second synchronization event, the second synchronization event being a falling edge of a synchronization pulse.

7. The method as claimed in claim 1, wherein with or after the building up of the mains voltage, the specification of the target mains voltage changes from depending on the virtual target mains voltage to depending on a measured mains voltage.

8. The method as claimed in claim 1, wherein the load to be supplied is distributed evenly to the plurality of VISMA power inverters, triggered by a second synchronization event.

9. The method as claimed in claim 1, further comprising:
determining a virtual target current value for each VISMA power inverter, and
adjusting a virtual current to the virtual target current value.

10. The method as claimed in claim 9, wherein the mains voltage is built up after expiration of a response time of the virtual current.

11. The method as claimed in claim 1, wherein the mains voltage is built up after expiration of a predetermined response time of 20 ms to 200 ms.

12. The method as claimed in claim 11, wherein with or after the expiration of the predetermined response time, the specification of the target mains voltage changes from depending on the virtual target mains voltage to depending on a measured mains voltage.

13. The method as claimed in claim 1, wherein the mains voltage is built up over a defined ramp.

14. The method as claimed in claim 1, wherein the VISMA power inverters are connected to a DC link for supply with power.

15. A voltage supply system, comprising:
a plurality of independently controlled virtual synchronous machine (VISMA) power inverters connected to a DC voltage, wherein outputs of the plurality of VISMA power inverters are connected together to a load, the load requiring more power than a single one of the plurality of VISMA power inverters is able to deliver, and
a synchronization event generator connected to a synchronization event input of each VISMA power inverter, wherein the synchronization event generator is configured to transfer a synchronization event to all of the plurality of VISMA power inverters,
wherein each respective VISMA power inverter is configured to:
build up a VISMA control of an output AC voltage at the output thereof depending on a predetermined target mains voltage,
synchronize a phase position of the output AC voltage to a first synchronization event that is received at the synchronization event input from the synchronization event generator, and
build up a mains voltage simultaneously with all of the plurality of VISMA power inverters with a matched phase position after synchronization of the phase position has taken place.

16. The voltage supply system as claimed in claim 15, wherein each VISMA power inverter is further configured to build up the mains voltage synchronously to a second synchronization event.

17. The voltage supply system as claimed in claim 15, wherein a control model is stored in each VISMA power inverter, wherein the control model is configured to calculate a virtual current that is returned to the control model as a virtual target current value.

* * * * *